US012630429B2

(12) United States Patent
Thevamaran et al.

(10) Patent No.: US 12,630,429 B2
(45) Date of Patent: May 19, 2026

(54) CARBON-BASED COMPOSITE MATERIALS WITH ENHANCED DYNAMIC PERFORMANCE

(71) Applicant: Wisconsin Alumni Research Foundation, Madison, WI (US)

(72) Inventors: Ramathasan Thevamaran, Madison, WI (US); Jizhe Cai, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 83 days.

(21) Appl. No.: 18/679,597

(22) Filed: May 31, 2024

(65) Prior Publication Data

US 2024/0308855 A1 Sep. 19, 2024

Related U.S. Application Data

(63) Continuation of application No. 17/516,113, filed on Nov. 1, 2021, now Pat. No. 12,024,434.

(51) Int. Cl.
| | |
|---|---|
| *C01B 32/21* | (2017.01) |
| *B82Y 30/00* | (2011.01) |
| *C01B 32/158* | (2017.01) |
| *D01F 1/10* | (2006.01) |
| *D01F 6/60* | (2006.01) |

(52) U.S. Cl.
CPC ............ *C01B 32/21* (2017.08); *C01B 32/158* (2017.08); *D01F 1/10* (2013.01); *D01F 6/605* (2013.01); *B82Y 30/00* (2013.01); *C01B 2202/06* (2013.01)

(58) Field of Classification Search
CPC ... C01B 32/21; C01B 32/158; C01B 2202/06; C01B 32/194; D01F 1/10; D01F 6/605; D01F 9/127; B82Y 30/00
See application file for complete search history.

(56) References Cited

U.S. PATENT DOCUMENTS

| | | | | |
|---|---|---|---|---|
| 2004/0223900 A1* | 11/2004 | Khabashesku | ........ | C01B 32/174 |
| | | | | 423/447.1 |
| 2015/0034859 A1* | 2/2015 | Compton | ................. | C08K 7/24 |
| | | | | 252/511 |
| 2017/0210627 A1* | 7/2017 | Jayasinghe | ........... | C01B 32/168 |

FOREIGN PATENT DOCUMENTS

| | | | | | |
|---|---|---|---|---|---|
| CN | 110845789 A | * | 2/2020 | .............. | C08L 23/12 |
| KR | 20210022960 A | * | 3/2021 | .............. | C08L 63/00 |

OTHER PUBLICATIONS

Machine Translation CN110845789 (Year: 2020).*
Machine Translation KE20210022960 (Year: 2021).*

* cited by examiner

*Primary Examiner* — Jennifer A Steele
(74) *Attorney, Agent, or Firm* — Bell & Manning, LLC

(57) ABSTRACT

Carbon-based composite materials are provided, such as those comprising at least 80 weight % of graphitic carbon comprising functional groups capable of forming hydrogen bonds, the graphitic carbon in the form of a mat of randomly entangled elongated structures; not more than 20 weight % of a polymer or a nanofiber thereof, dispersed within the graphitic carbon, the polymer or the nanofiber thereof comprising corresponding functional groups capable of forming hydrogen bonds with the functional groups of the graphitic carbon; and a plurality of hydrogen bonds at an interface formed between the graphitic carbon and the polymer or the nanofiber thereof, the plurality of hydrogen bonds formed between the functional groups of the graphitic carbon and the corresponding functional groups of the polymer or the nanofiber thereof.

20 Claims, 12 Drawing Sheets

Flexible ANF-CNT mat

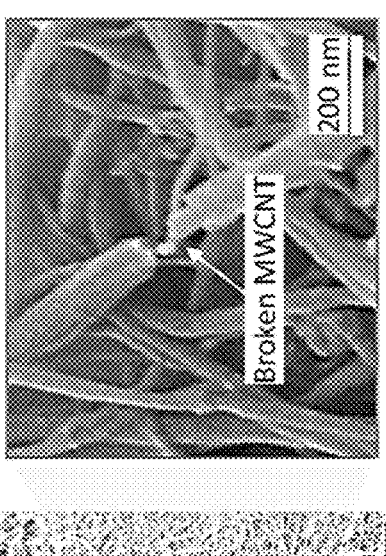
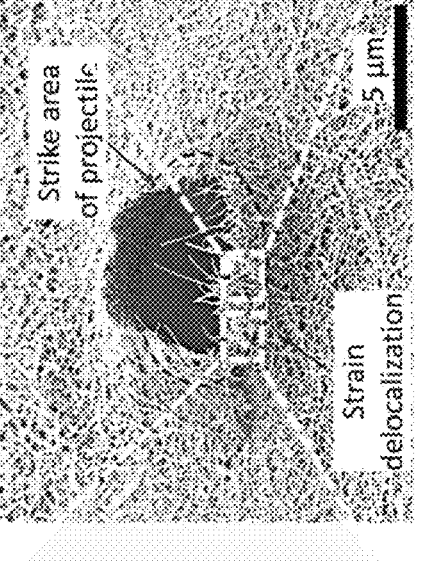
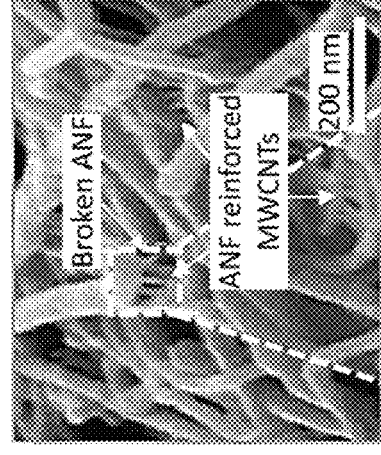
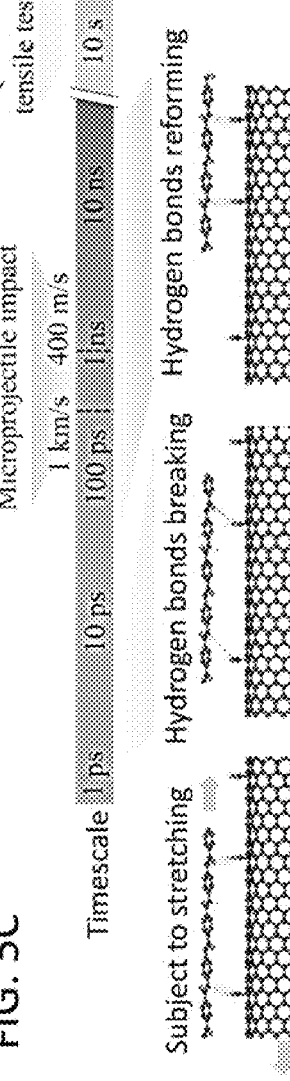
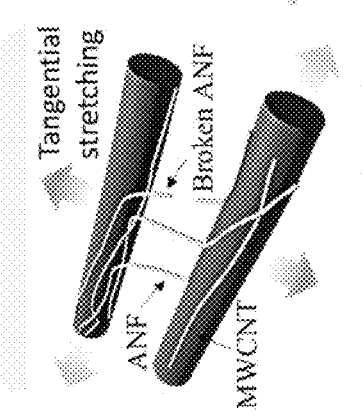
FIG. 5A
FIG. 5B
FIG. 5C

1

CARBON-BASED COMPOSITE MATERIALS WITH ENHANCED DYNAMIC PERFORMANCE

CROSS-REFERENCE TO RELATED APPLICATIONS

The present application is a continuation of U.S. patent application Ser. No. 17/516,113, filed on Nov. 1, 2021, the entire content of which is hereby incorporated herein by reference.

REFERENCE TO GOVERNMENT RIGHTS

This invention was made with government support under W911NF-20-1-0160 awarded by the ARMY/ARO. The government has certain rights in the invention.

BACKGROUND

Energy absorbing materials with unprecedented dynamic performance under ballistic impacts are essential for various protective applications—from armors for soldiers to mitigating micro-debris impacts on air and spacecraft. Superior dynamic performance achieved through lightweight protective materials is critical for the agility and fuel efficiency of personal and armored vehicles, drones, hypersonic aircraft, and spacecraft. High specific energy absorption and efficient stress delocalization determine the performance of protective materials against projectile impacts. Specific energy absorption is the ability of a unit-weight material to dissipate the kinetic energy of an impacting projectile. The stress delocalization efficiency characterizes how fast the impact-induced stress waves travel from the impact zone such that the localized failures can be retarded or mitigated.

SUMMARY

Provided are carbon-based composite materials exhibiting desirable mechanical properties under dynamic conditions, including high specific energy absorption ($E_a$*). As such, the materials may be used as a protective barrier against a variety of types of projectile impacts. By way of illustration, the Example, below, describes the fabrication and testing of an illustrative carbon-based composite material composed of entangled carboxyl-functionalized multi-walled carbon nanotubes (MWCNTs) and aramid nanofibers distributed throughout the entangled carboxy-functionalized MWCNTs. Individual carboxy-functionalized MWCNTs and individual aramid nanofibers (ANFs) associate with one another through a dynamic network of hydrogen bonds (as well as π-π stacking) at the interface between surfaces of the MWCNTs and the ANFs. The results summarized in the Example show a synergistic increase in $E_a$* as compared to the individual components of the composite (MWCNTs, ANFs) over a very narrow range of ANF content, but across a broad range of projectile impact velocities. Moreover, the dynamic hydrogen bonding afforded by such a composite provides surprisingly large $E_a$* enhancements, including a 100% enhancement over the MWCNTs alone at projectile impact velocities of 400 m/s.

In embodiments, a composite material comprises at least 80 weight % of graphitic carbon comprising functional groups capable of forming hydrogen bonds, the graphitic carbon in the form of a mat of randomly entangled elongated structures; not more than 20 weight % of a polymer or a nanofiber thereof, dispersed within the graphitic carbon, the polymer or the nanofiber thereof comprising corresponding functional groups capable of forming hydrogen bonds with the functional groups of the graphitic carbon; and a plurality of hydrogen bonds at an interface formed between the graphitic carbon and the polymer or the nanofiber thereof, the plurality of hydrogen bonds formed between the functional groups of the graphitic carbon and the corresponding functional groups of the polymer or the nanofiber thereof.

Methods of using the composite materials are also provided. An embodiment comprises exposing any of the disclosed composite materials to a source of projectiles and intercepting a projectile from the source.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 5A shows SEM images of the deformation zone from ANF-CNT mats revealing the energy dissipation mechanisms beyond the inter-fiber sliding, including broken ANFs between MWCNTs and broken MWCNTs. FIG. 5B shows an illustration of the ANF-CNT interactive deformation with strengthened interfacial interactions. FIG. 5C shows an illustration of approximate timescales of hydrogen bond breaking and reformation relative to the tensile deformation duration under microprojectile impacts at 400 m/s to 1 km/s velocities and quasistatic tensile testing.

DETAILED DESCRIPTION

The present disclosure provides carbon-based composite materials. The primary, base component of the composite materials is graphitic carbon. By "graphitic carbon," it is meant that the base component has its carbon atoms covalently bound to one another in a hexagonal crystal structure as in graphene. In embodiments, the graphitic carbon is in the form of a plurality of elongated structures characterized by relatively high aspect ratios, e.g., at least 100, at least 1000, at least 10,000 and from 100 to 40,000. Terms such as nanorods, nanofibers, nanowhiskers, nanotubes, and the like may be used to describe various suitable elongated forms of the graphitic carbon. Hollow such structures, e.g., nanotubes, may be desirable for having lighter weights and superior mechanical properties as compared to their non-hollow counterparts, e.g., nanorods of the same outer dimensions (e.g., diameter and length). The elongated structures may be characterized by a diameter, which may be no more than 1 μm, no more than 500 nm, no more than 100 nm, no more than 10 nm, and from 10 nm to 10 μm. Similarly, the elongated structures may be characterized by a length, which may be at least 1 μm, at least 10 μm, at least 100 μm, of from 1 μm to over 1 mm. Any of the numeric values described above (and throughout the present disclosure) may be average values, which may be determined from scanning electron microscope (SEM) and/or atomic force microscope (AFM) images as described in the Example, below. A single type or a combination of different types of elongated structures may be used as the base component of the composite material.

Figure 1A:
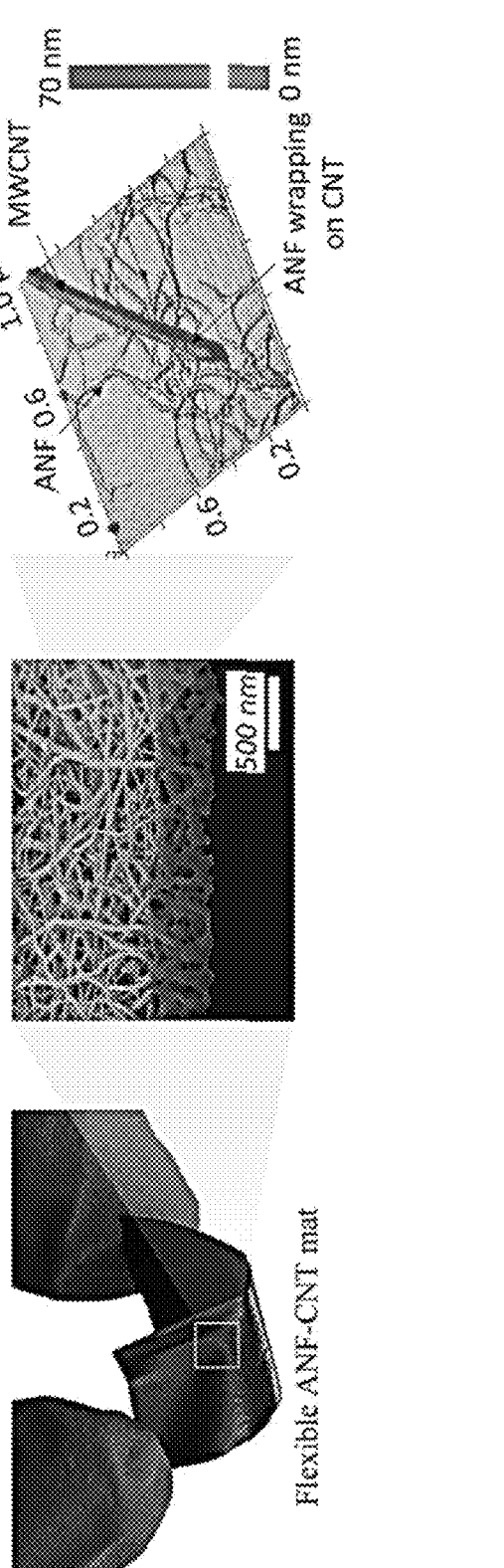
FIG. 1A shows a photograph of a highly-flexible thick ANF-CNT mat (18±1 μm) with the SEM view showing a FIB cross-section of a two-dimensional randomly oriented fiber network of a thin mat (501±73 nm) and an AFM height map showing the ANFs wrapping around CNTs and forming a connecting network from the mixture of ANFs and CNTs on a substrate.
Figure 1B:
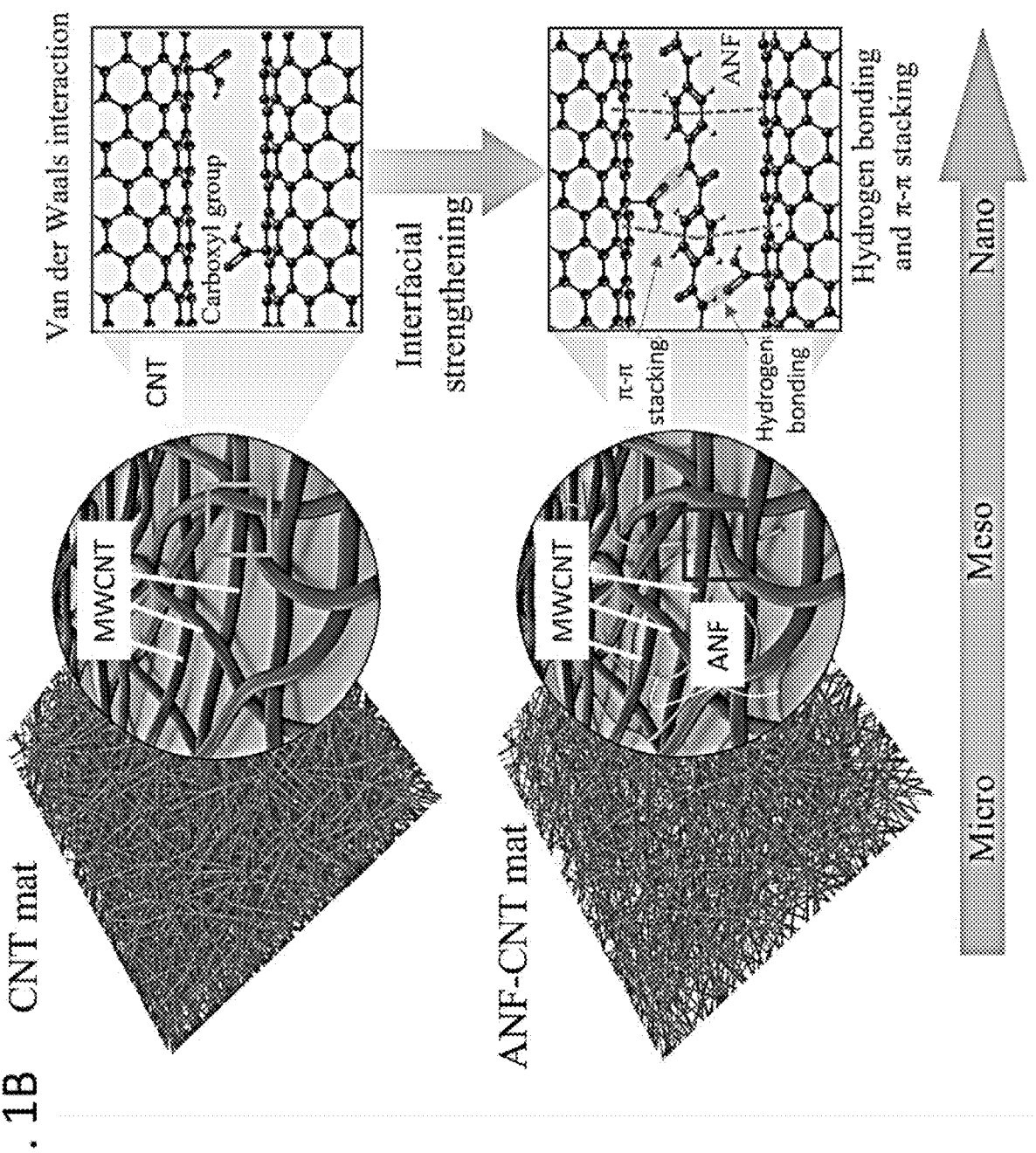
FIG. 1B is an illustration showing the structure of an MWCNT mat; the introduction of ANFs as reinforcement augments the weaker van der Waals interactions between adjacent CNTs in the initial MWCNTs mat with stronger hydrogen bonds and π-π stacking between ANFs and functionalized MWCNTs.

The graphitic carbon of the present composite material forms a carbon matrix into which a secondary, minor component is dispersed. When elongated forms of graphitic carbon are used, the individual elongated structures are generally randomly entangled with one another. In addition, the longitudinal axes defined by individual elongated structures are generally curved, rather than straight. The individual elongated structures may also be described as being unbundled and unaligned with one another, which distinguishes elongated structures assembled in the form of a thread or yarn. This does not preclude there being some bundled and/or aligned elongated structures in the present composite materials, but generally, a majority (e.g., greater than 50%, greater than 75%, or greater than 90%) of the elongated structures are unbundled and unaligned. These features generally result in a flexible, porous, but unitary structure, which may be referred to as a mat or film or the like (such terms may be used interchangeably). The terms "mat," "film," and the like are also used to connote the planar nature of such structures, having one dimension, e.g., along the z-axis, that is much smaller than the other two dimensions, e.g., along the x and y axes. These other two dimensions may have more similar magnitudes. This further distinguishes mats, films, and like from structures such as threads, yarns, and the like. An illustrative mat of MWCNTs is shown in FIG. 1B. The carbon matrix, whether formed of elongated structures such as MWCNTs or another form of graphitic carbon, may be characterized by a density, which may be no more than 1000 kg/m³, no more than 750 kg/m³, no more than 500 kg/m³, no more than 450 kg/m³, no more than 400 kg/m³, or from 420 kg/m³ to 1300 kg/m³. Densities may be measured using the techniques described in the Example, below.

Exclusive of any functionalization (as described further below), the graphitic carbon itself is generally composed primarily of carbon and hydrogen, as opposed to other elements such as oxygen. The term "composed primarily of" encompasses "consisting of" and may refer to being composed of more than 80 weight % of carbon and hydrogen, including more than 85 weight % of carbon/hydrogen, and about 90 weight % of carbon/hydrogen. In embodiments, the graphitic carbon is not graphene oxide or graphite oxide. However, in embodiments, the graphitic carbon is graphene or graphite. In embodiments, the graphitic carbon is in the form of single-walled carbon nanotubes (SWCNTs), MWCNTs, or a combination thereof. The term "carbon nanotubes (CNTs)" may be used to encompass both SWCNTs and MWCNTs. CNTs may be fabricated using known techniques or obtained from commercial sources. Very low-density films of CNTs may be used, including those commercially available from Tortech having a volumetric mat density of 390 kg/m³.

The graphitic carbon of the present composite materials comprises functional groups on surfaces thereof capable of forming hydrogen bonds with corresponding functional groups provided by the minor component of the composite material. Generally, the functional groups of the graphitic carbon comprise hydrogen bond acceptor groups which are capable of forming hydrogen bonds with hydrogen bond donor groups provided by the minor component. An illustrative hydrogen bond acceptor group is a carboxyl group —COOH, which, when deprotonated, may form a hydrogen bond with a hydrogen bond donor group, e.g., —COO:····H. (See FIG. 1B.) Another illustrative hydrogen bond acceptor group is a carbon-oxygen double bond, —C═O. The "—" refers to a covalent bond to a carbon of the graphitic carbon. In embodiments, the hydrogen bond acceptor group, e.g., —COOH or —C═O is directly covalently bound to a carbon of the graphitic carbon, i.e., without a separate linking group therebetween. Graphitic carbon functionalized with carboxyl groups (and in embodiments, also carbon-oxygen double bonds) may be obtained via an acid treatment, e.g., as described in the Example, below.

The amount of functional groups of the graphitic carbon may be adjusted as desired, including to achieve the values of $E_a^*$ described herein. In embodiments, the total amount of functional groups (e.g., —COOH, —C═O, or both) is no more than 13 weight % as compared to the total weight of the graphitic carbon. This includes no more than 10 weight %, no more than 8 weight %, no more than 6 weight %, or in a range of from 4 to 8 weight %.

In embodiments, the graphitic carbon is not coated or functionalized with an oligomer or polymer comprising carboxylic acid and/or ester groups. In embodiments, the graphitic carbon is not coated or functionalized with octyl phenoxy polyethoxy groups.

As noted above, in the present composite materials, a secondary, minor component is dispersed within the carbon matrix provided by the graphitic carbon. The minor component comprises the corresponding functional groups for forming hydrogen bonds with the functional groups of the graphitic carbon. Generally, the corresponding functional groups of the minor component comprise hydrogen bond donor groups which comprise a hydrogen atom covalently bound to an electronegative atom, e.g., N, O.

The minor component may be a polymer comprising a plurality of the functional groups, including hydrogen bond donor groups. Illustrative such polymers include poly(vinyl alcohol), cellulose, poly(paraphenylene terephthalamide), poly(etherimide), and poly(amide-imide). However, like the primary, base component, the secondary, minor component may also be in the form of elongated structures. In the case of the minor component, each elongated structure may comprise a plurality of individual polymer chains bundled together (which may be referred to as a polymer nanofiber). For example, poly(paraphenylene terephthalamide) may be used in the form of aramid nanofibers (ANF) in which individual polymer chains are bundled and held together via hydrogen bonding and π-π stacking. However, when bundles of poly(paraphenylene terephthalamide) are used, generally larger bundles such as macroscale Kevlar threads are not used as the minor component. Cellulose may be used in the form of nanofibrillated cellulose in which individual polymer chains are bundled and held together via hydrogen bonds. Aspect ratios, diameters, and lengths of these elongated structures may be within the ranges described above for the primary, base component of the present composite materials. A single type or a combination of different types of the minor component may be used in the composite material.

As noted above, the present composite materials comprise hydrogen bond accepting (or donating) graphitic carbon as a base component with an amount of a hydrogen bond donating (or accepting) minor component distributed therein. As such, the interface between the surfaces of the graphitic carbon and the minor component is dynamic, comprising a plurality of hydrogen bonds capable of forming, breaking, and reforming during use of the composite material (e.g., while intercepting projectiles). Although the role of such hydrogen bonding has been studied in some other composite materials, the present disclosure is based, at least in part, on the inventors' findings that a surprisingly large enhancement in $Ea^*$ may be achieved by introducing a relatively small amount of such dynamic hydrogen bonding to graphitic carbon.

The amount of dynamic hydrogen bonds/bonding in the present composite materials may be controlled via the amounts of the hydrogen bond accepting component (generally, the base component, graphitic carbon such as functionalized CNTs) and the hydrogen bond donating component (generally, the minor component such as a polymer or polymer nanofiber). In embodiments, hydrogen bond accepting graphitic carbon and a hydrogen bond donating minor component are present at a weight ratio of from 1:0.25 to 1:0.02. This includes weight ratios of 1:0.20, 1:0.18, 1:0.15, 1:0.12, 1:0.10, 1:0.05, 1:0.04, and 1:0.03. In embodiments, hydrogen bond accepting graphitic carbon is present an amount of at least 80 weight %. (The term "weight %" refers to the total weight of the relevant component as compared to the total weight of the composite material.) This includes at least 85 weight %, at least 90 weight %, at least 95 weight %, at least 96 weight %, at least 97 weight %, and at least 98 weight %. In embodiments, a hydrogen bond donating minor component is present an amount of no more than 20 weight %. This includes no more than 15 weight %, no more than 10 weight %, no more than 5 weight %, no more than 4 weight %, no more than 3 weight %, and no more than 2 weight %. In embodiments, hydrogen bond accepting graphitic carbon is present at an amount of at least 90 weight % and a hydrogen bond donating minor component is present at an amount in a range of from 3 weight % to 10 weight %, from 4 weight % to 9 weight %, or from 5 weight % to 8 weight %.

The present composite materials may include additives, e.g., shear-thickening fluids, silica particles in polyethylene glycol, other nanoparticle or nanolayer coatings. However, in embodiments, the composite is free of any additives and thus, may be described as "consisting of" the base component and the minor component. However, "consisting of" encompasses the presence of small amounts (e.g., less than 1 weight %, less than 0.5 weight %, less than 0.1 weight %) of components, impurities, etc. that may be present due to the inherent nature of the techniques used to fabricate the composite materials. In embodiments, the composite material further comprises a resin, e.g., an epoxy resin. In other embodiments, the composite material is free of a resin, such as a fluorocarbon resin or a thermosetting resin.

The present composite materials may be characterized by their morphology, which is generally dictated by the morphology of the graphitic carbon being used. Thus, in embodiments, the composite material itself has a flat, planar, two-dimensional morphology such as the mats, films, etc. described above. Such structures may be characterized by a thickness. The thickness depends upon the desired application for the composite material, but illustrative thicknesses may be in a range of from 100 nm to 1 mm. By way of illustration, when used as a protective barrier against a projectile impact such as a 9 mm bullet, a thickness of 0.9 mm is particularly suitable. Thicknesses may be reported as average values using the techniques described in the Example, below.

The present composite materials may be characterized by certain dynamic mechanical properties, including $E_a^*$, their specific energy absorption. Values of $E_a^*$ may be measured as described in the Example, below, and may be reported by reference to the projectile impact velocity used during the measurement. As noted above, embodiments of the composite materials exhibit a synergistic improvement in $E_a^*$ as compared to the individual components of the composite. (See FIG. 4A.) Moreover, the dynamic hydrogen bonding afforded by such a composite provides surprisingly large $E_a^*$ enhancements, including an 100% enhancement over graphitic carbon alone at low projectile impact velocities. (Also see FIG. 4A.) In embodiments, the composite material exhibits an $E_a^*$ enhancement of at least 85% as compared to a comparative material composed of only the graphitic carbon of the composite material. This includes an $E_a^*$ enhancement of at least 90%, at least 95%, and at least 98%. These $E_a^*$ enhancements may be reported by reference to a specific projectile impact velocity, e.g., 400 m/s, and measured as described in the Example, below.

The present composite materials may be further configured (e.g., cut, shaped, molded, etc.) and/or combined with other components for use as a protective barrier against projectile impacts. The type of projectile impact and the resulting protective barrier are not particularly limited but may include, e.g., bullets, shrapnel, debris, etc., and shields, helmets, armor, etc.

Methods of fabricating the present composite materials are also encompassed by the present disclosure. An illustrative method is described in the Example, below. However, other methods may be used.

Methods of using the present composite materials are also encompassed by the present disclosure. An illustrative method comprises intercepting a projectile with any of the disclosed composite materials. This may occur by exposing any of the disclosed composite materials to a source of the projectile. At least some kinetic energy of projectiles impacting a surface of the composite material is absorbed by the composite material, thereby protecting a surface underlying the composite material (e.g., a person, a structure, a machine, etc.)

EXAMPLE

Introduction

Herein is presented an efficient approach for creating lightweight ANF-reinforced MWCNT mats (ANF-CNT mats) with strengthened interfacial interactions yielding significant enhancement in energy dissipation and mitigation of localized fracture during high-velocity (400 m/s–1 km/s) micro-projectile impacts. It was demonstrated that a small, optimal amount of ANF reinforcement in MWCNT mats results in synergistically improved quasistatic and dynamic mechanical performances, originating from the augmentation of inter-tube interactions by hydrogen bonding and π-π stacking interactions among the MWCNTs and ANFs. Surprisingly, the highest specific energy absorption, $E_a^*$, reached 3.6 MJ/kg at 1 km/s impact, which is 40% greater than the pristine MWCNT mats and superior to widely used macroscopic protective materials. It was also discovered that the performance of the ANF-CNT mats is mediated by the response timescale of hydrogen bond interactions, making the material's behavior strain rate sensitive. The rate-dependent reinforcing effect of the inter-fiber hydrogen bonds along with the high thermal stability of MWCNTs and ANFs provides a new scalable material design pathway for fabricating low-density thermally-stable nanofibrous materials with superior specific properties for extreme engineering applications.

Experimental Section

Preparation of dispersed nanofiber solution. The aramid nanofiber (ANF) was fabricated by splitting the macroscopic Kevlar fibers. Briefly, 1 g bulk Kevlar 69 yarns (Thread Exchange Inc.) and 1.5 g KOH (STREM Chemicals, Inc.) were added into 500 mL of dimethyl sulfoxide (DMSO) (fisher chemical) and magnetically stirred vigorously at room temperature for 7 days, which resulted in the dark red ANF/KOH/DMSO solution. Then, deionized water was added into the diluted ANF/DMSO dispersion solution (0.2 mg/mL), followed by 1 hour of stirring to reprotonate the hydrogen bonds between chains of ANF and form homogeneous dispersion of ANFs in DMSO solution. The ANF/DMSO mixture was then vacuum filtered on nylon filter membrane (diameter: 47 mm, pore size: 0.22 μm). The filtered film was thoroughly rinsed by deionized water and dried in vacuum for 12 hours.

The multi-walled carbon nanotubes (MWCNTs) were synthesized by a floating-catalyst thermal chemical vapor deposition process in a vertically-aligned CNT forest form. Acid treatment was applied to functionalize the MWCNTs with carboxyl groups (—COOH) to enhance its dispersibility in DMSO solvent. Briefly, 200 mg as-received MWCNTs was added into 120 mL mixture of concentrated $H_2SO_4$ and $HNO_3$ (ratio=3:1), followed by magnetic stirring for 4 hours at 60° C. The solution was then diluted with deionized water and vacuum filtered by PVDF membrane (diameter: 47 mm, pore size: 0.22 μm), followed by deionized water washing to remove the residual acids. Then, the obtained functionalized MWCNTs were dried in vacuum at 60° C. for 48 hours. The homogeneous MWCNT/DMSO solution was obtained by dispersing 5 mg MWCNTs in 50 mL of DMSO by 15 min sonication with a probe sonicator (amplitude: 40%). The dispersion was then centrifuged at 8000 rpm for 10 mins to remove the undispersed CNT bundles that settled at the bottom of the vial.

The hybrid ANF/MWCNT/DMSO solution was obtained by adding a desired amount of ANF/DMSO (0.2 mg/mL) solution to MWCNT/DMSO solution (0.1 mg/mL) to achieve different concentrations of ANF reinforcement in ANF-CNT mats. Then, deionized water was added in the ANF/MWCNT/DMSO solution and stirred for 2 h to reprotonate the —NH group in ANF and facilitate the formation of hydrogen bonds between ANFs and functionalized MWCNTs. Different amounts of the ANF/MWCNT/DMSO solution were vacuum filtrated by Nylon membrane (diameter: 47 mm, pore size: 0.22 μm) to fabricate the ANF-CNT mats with different thicknesses on membrane.

Fabrication of nanofiber mats for quasistatic and micro-ballistic tests. Different types of nanofiber mats, including ANF, MWCNT, and ANF-CNT mats on filter membranes were attached to the water-soluble tape, and then peeled off from the filter membrane. To fabricate thick films (thickness ~25 μm) for quasistatic tensile testing, the nanofiber mats on water soluble tapes were immersed in deionized water for 24 h. After the full dissolution of the tape, the free-standing films were picked up by metal frame and then dried before testing. To fabricate thin film (thickness=~500 nm) for micro-ballistic testing, the films on water-soluble tapes were deposited onto 100 mesh Ni TEM grids with small amounts of epoxy glue applied on them. With the same procedure as the thick films for dissolving water-soluble tape, free-standing nanofiber films deposited on TEM grids were obtained for the micro-ballistic testing.

Material Characterization. The surface morphologies and post-impact deformation micro/nanostructures of different types of nanofiber mats were imaged by a Zeiss LEO 1550 VP scanning electron microscope (SEM) at the Wisconsin Centers for Nanoscale Technology. Bruker Icon atomic force microscopy (AFM) in tapping mode was used to examine the dispersion homogeneity and average diameter of ANFs in the ANF-CNT mats. The average diameters of CNTs and ANFs were calculated based on over 50 measurements from SEM and AFM height images, respectively. Zeiss Auriga FIB/FESEM was used to cut the thin CNT films and image the cross-sectional views to measure the average thickness of the nanofiber mats. For each mat, more than five positions were cut by FIB milling to calculate the average thickness. The obtained average thickness of MWCNT mats and ANF-CNT mats with different concentrations of ANF (4, 8, 12 wt. %) were 501±73 nm, 482±75 nm, 553±67 nm and 661±66 nm, respectively. Chemical structures of different mats were characterized using a Thermo Scientific DXRxi Raman imaging Microscope with 532 nm excitation and Nicolet Magna 860 FT-IR spectrophotometer. A TA Q500 thermogravimetric analyzer (TGA) with 10° C./min heating rate from 30 to 800° C. under nitrogen atmosphere was used to characterize the thermal property of the mats.

Quasistatic tensile testing. Micro-tensile tests were performed in an Instron ElectroPulse E3000 universal testing system with a 5 N loadcell at the lab. The samples with dimensions of approximately 5 mm (length)*2 mm (width) *0.02 mm (thickness) were cut from free-standing films. The size (length and width) of the samples was measured by a caliper after being fixed in the tensile grip. The thickness of the sample was measured from the cross-sectional SEM images. Three samples of each mat were prepared and tested with the tensile strain rate of $10^{-2}$ $s^{-1}$.

Micro-ballistic testing. The micro-ballistic testing was performed in a laser-induced microprojectile impact testing system (LIPIT) built in the lab. The preparation of a launch pad with a silica microsphere projectile follows the procedure described in Cai, J. et al., *Nano Lett.* 2020, 20 (8), 5632-5638. Briefly, a homogeneous dispersion of monodisperse silica microspheres (Cospheric) with 9.2 μm diameter in ethanol was prepared by vortex mixing. Then, the solution was drop cast on the launch pad—a 210 μm thick microscope glass slide coated with 50 nm-thick gold followed by about 30 μm crosslinked PDMS film. By one pulse of Nd-YAG ablation laser (5-8 ns pule duration, 1064 nm) that ablated the gold layer in the launch pad, the rapid expansion of the PDMS layer launched the micro-projectile towards the sample at controlled velocities proportional to the laser energy. By tuning the ablation laser energy, a broad range of projectile velocities were achieved (100 m/s–1 km/s). The flight of the projectile was recorded in a monochromatic camera (Allied Vision Mako G-234B) gated by an acoustic-optic modulator (ISOMET 1250C-848) and illuminated by a supercontinuum white laser (NKT Photonics SuperK EXR-20) with a tunable laser pulse interval (90-154 ns). About 10 impact experiments were performed for each mat and each impact velocity.

Density Measurement of ANF-CNT Mats

The densities of pure CNT mats and ANF-CNT mats with different concentrations of ANFs were measured by weighing the free-standing thick mats made by the same vacuum assisted filtration process as the thin films with known area (measured by caliper) and thickness (measured by cross-sectional SEM imaging). The measured densities are listed in the following Table 1.

TABLE 1

Thickness and density of CNT mats and ANF-CNT mats with different concentrations of ANFs.

| Samples | CNT | 4 wt. % ANF-CNT | 8 wt. % ANF-CNT | 12 wt. % ANF-CNT |
|---|---|---|---|---|
| Thickness (μm) | 24.4 ± 0.9 | 23.4 ± 1 | 24.1 ± 0.6 | 22.3 ± 0.9 |
| Density (kg/m³) | 419 ± 17 | 432 ± 20 | 448 ± 11 | 481 ± 20 |

Dynamic Strain Rate Calculation

The strain-rate calculation followed the same approach used in Cai, J. et al., *Nano Lett.* 2020, 20 (8), 5632-5638. The clastic modulus (1.3 GPa) and mass density of the pure MWCNT mats (419 kg/m³) used for the dynamic strain-rate calculation were both obtained from the above-described experiments. The calculated strain rates for MWCNT mats with 400 and 1000 m/s impacts are $2.79 \times 10^7$ and $9.47 \times 10^7$ l/s, respectively.

Results and Discussion

Uniformly thick free-standing highly-flexible ANF-CNT mats were fabricated with homogeneous and randomly distributed nanofibers (FIG. 1A) by first mixing dispersed ANF/dimethyl sulfoxide (DMSO) solution in low concentrations into a carboxyl (—COOH) group-functionalized MWCNT/DMSO solution followed by vacuum-assisted filtration. The ANFs were synthesized by chemically splitting macroscale PPTA fibers via strong base-induced deprotonation between polymer chains in a saturated potassium hydroxide (KOH)/DMSO solution, which resulted in a homogeneous dispersion of ANFs in the DMSO solution. The MWCNTs were synthesized using a floating-catalyst thermal chemical vapor deposition process in a vertically-aligned forest, followed by an acid treatment to graft carboxyl groups onto outer layers, and then dispersed in the DMSO solution by sonication.

Each of the fabricated pure ANF and functionalized MWCNT mats presented distinct inter-fiber interactions: strong inter-fiber interactions from π-π stacking and hydrogen bonding in ANF mats, and weaker vdW interactions in functionalized MWCNTs mats. In addition to these interactive forces present in pure mats, reinforcing functionalized MWCNTs with small amounts of ANFs to fabricate the ANF-CNT mats induced π-π stacking and hydrogen bonds between the —NH group in ANFs and the carboxyl functional group grafted onto the outer shell of the MWCNTs (FIG. 1B). Nanofibers with two distinct diameter ranges—ANF: 2.9±0.9 nm and MWCNTs: 49±19 nm—were found across the samples, indicating the homogeneous distribution of ANFs and MWCNTs in the mat.

Figures 2A, 2B:
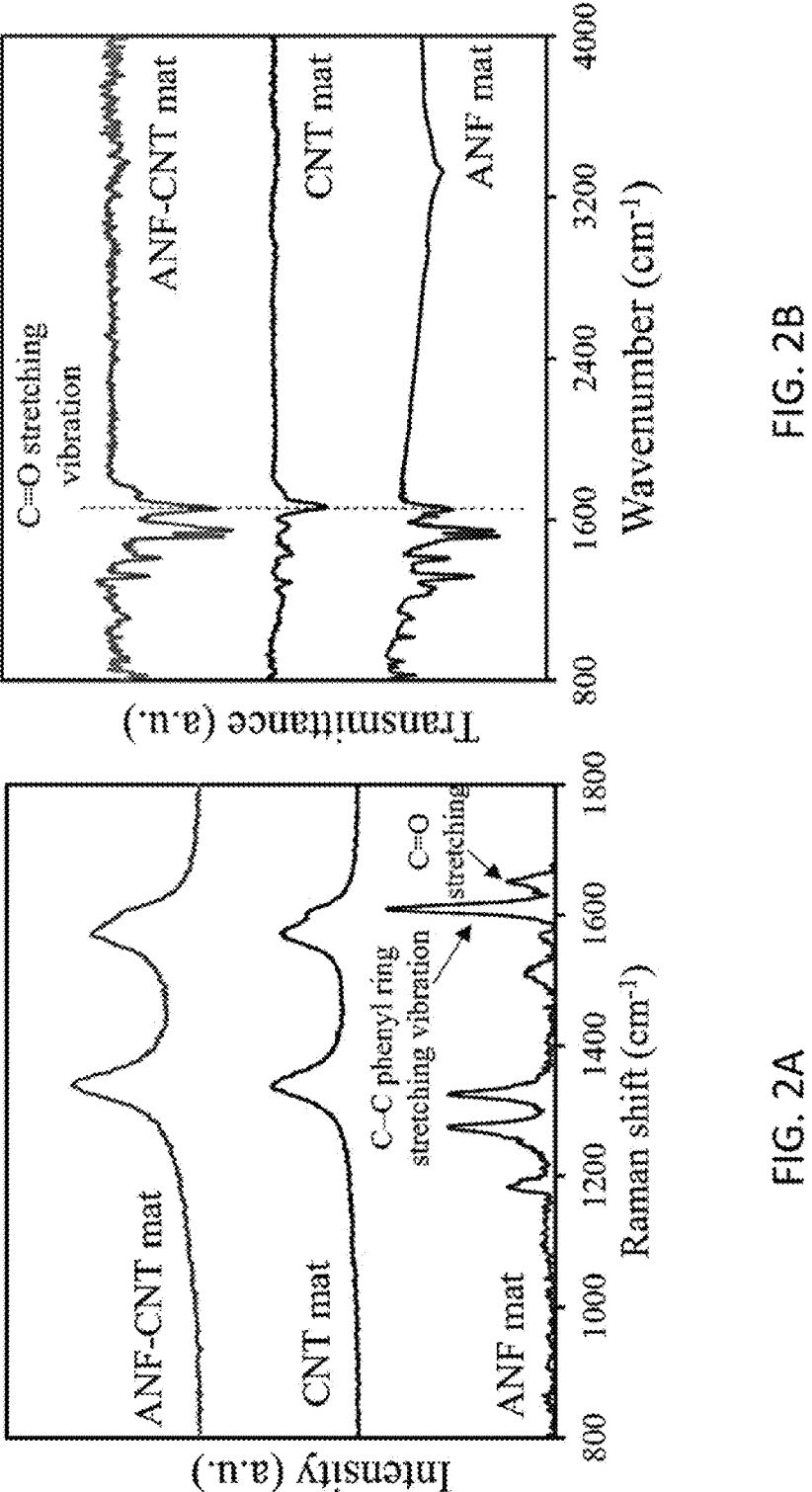
FIG. 2A shows Raman spectra and FIG. 2B shows FT-IR spectra of ANF, CNT, and ANF-CNT mats with 12 wt. % ANF.

Structural characteristics investigated through Raman and Fourier transform infrared (FT-IR) spectroscopies revealed characteristic peaks corresponding to various bond vibration modes of ANFs and MWCNTs as well as their interactions (FIGS. 2A-2B). Both Raman spectra and FT-IR of ANF mats show peak positions similar to those observed in macroscale Kevlar fiber, indicating the molecular structure of Kevlar macrofibers used for nanofiber fabrication had been preserved. Importantly, the hydrogen bond interactions in ANF-ANF interfaces were seen from the splitting of C=O, stretching the vibration mode peak into two peaks (1649 and 1657 cm$^{-1}$) corresponding to inter-and intra-nanofiber hydrogen bonds (FIG. 2B), respectively. The molecular vibration energy of chemical bonds seen in FT-IR is directly related to the interfacial bond strength. The small gap between the peaks with small bond-energy difference corresponding to inter-and intra-nanofiber hydrogen bonds suggests similar strengths in the hydrogen bonds formed between adjacent nanofibers and among aramid chains within each nanofiber. Moreover, in ANF-CNT mats, the presence of a single inter-fiber hydrogen bond peak (1651 cm$^{-1}$) further indicates the similar strengths between ANF-ANF and ANF-MWCNT inter-nanofiber hydrogen bonds, which had also been observed previously in PVA-ANF nanocomposites.

Figure 2C:
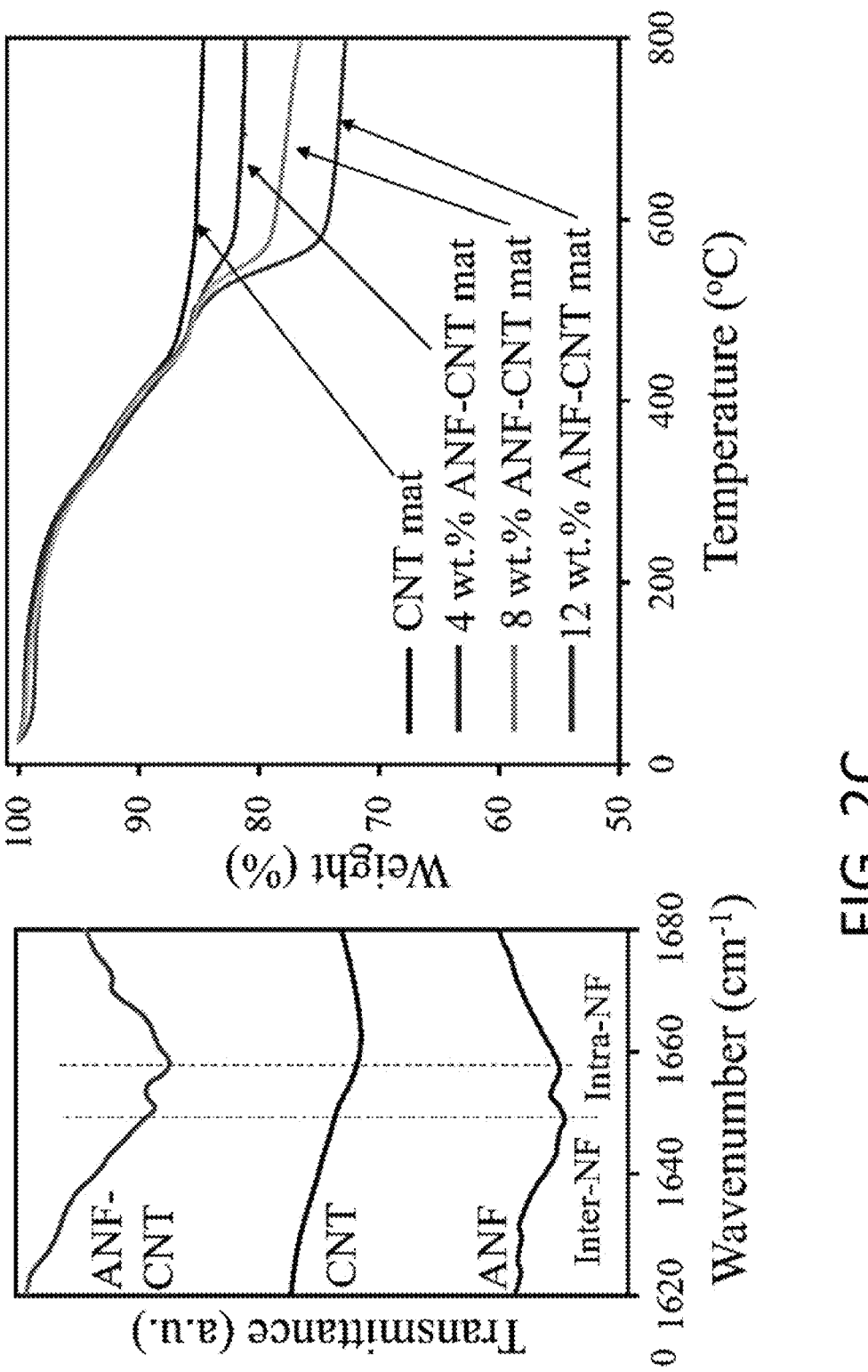
FIG. 2C shows TGA results of ANF-CNT mats with different ANF content (4 wt. %, 8 wt. % and 12 wt. %).

The thermogravimetric analysis (TGA) of the ANF-CNT mats (FIG. 2C) show that the thermally-stable CNT and ANF building blocks offered the mats an outstanding thermal stability up to 520° C.—the temperature at which the ANFs begin decomposing, reflected by the weight loss signature in TGA. The pure functionalized MWCNT mats exhibited thermal decomposition due to decarboxylation of the carboxyl groups and elimination of hydroxyl groups that were grafted on the surfaces of CNTs, and the removal of amorphous carbons resulted in 16% weight loss as the temperature went up to 800° C. Calculating the residual weight differences at 800° C. in ANF-CNT mats from their weight loss starting from 520° C. due to the thermal decomposition of ANFs allowed for the measurement of the exact amount of ANFs in ANF-CNT mats: 4 wt. %, 8 wt. %, and 12 wt. %. The outstanding thermal stability of the ANF-CNT mat (up to 520° C.) makes it attractive for protective applications in high-temperature environments, especially outperforming ultra-thin polymeric films with superior protective performances, such as PS ($T_g$=100° C.) and P(VDF-TrFE) ($T_m$=170° C.). (Hyon, J. et al., *Mater. Today* 2018, 21 (8), 817-824; Cai, J. *Nano Lett.* 2020, 20 (8), 5632-5638.)

Figures 2D, 2E:
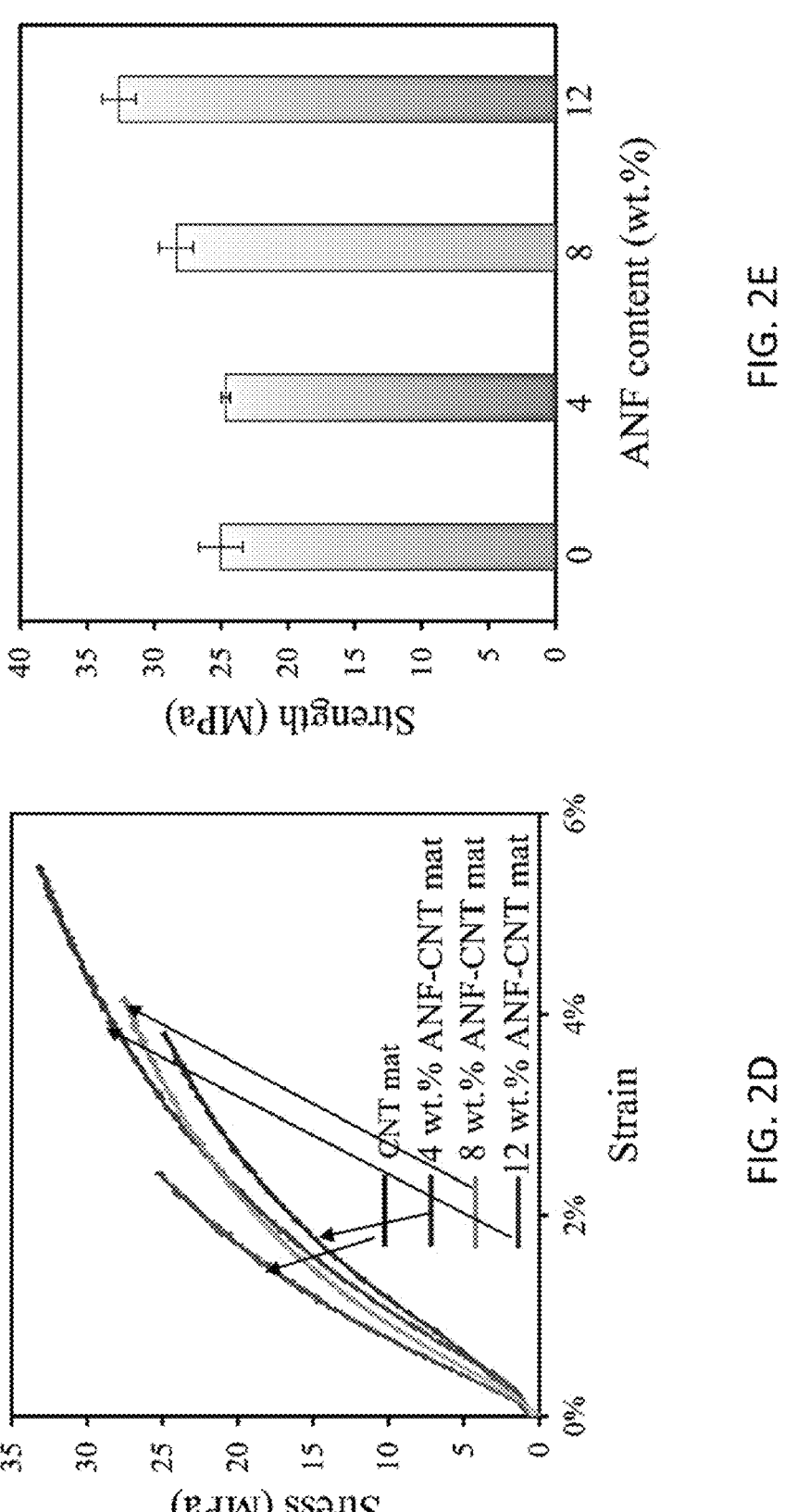
FIG. 2D shows characteristic quasistatic (0.01 l/s) stress-strain responses of CNT and ANF-CNT mats.
FIG. 2E shows average tensile strength and FIG. 2F shows average toughness of CNT and ANF-CNT mats with different ANF content (4, 8 and 12 wt. %).
Figure 2F:
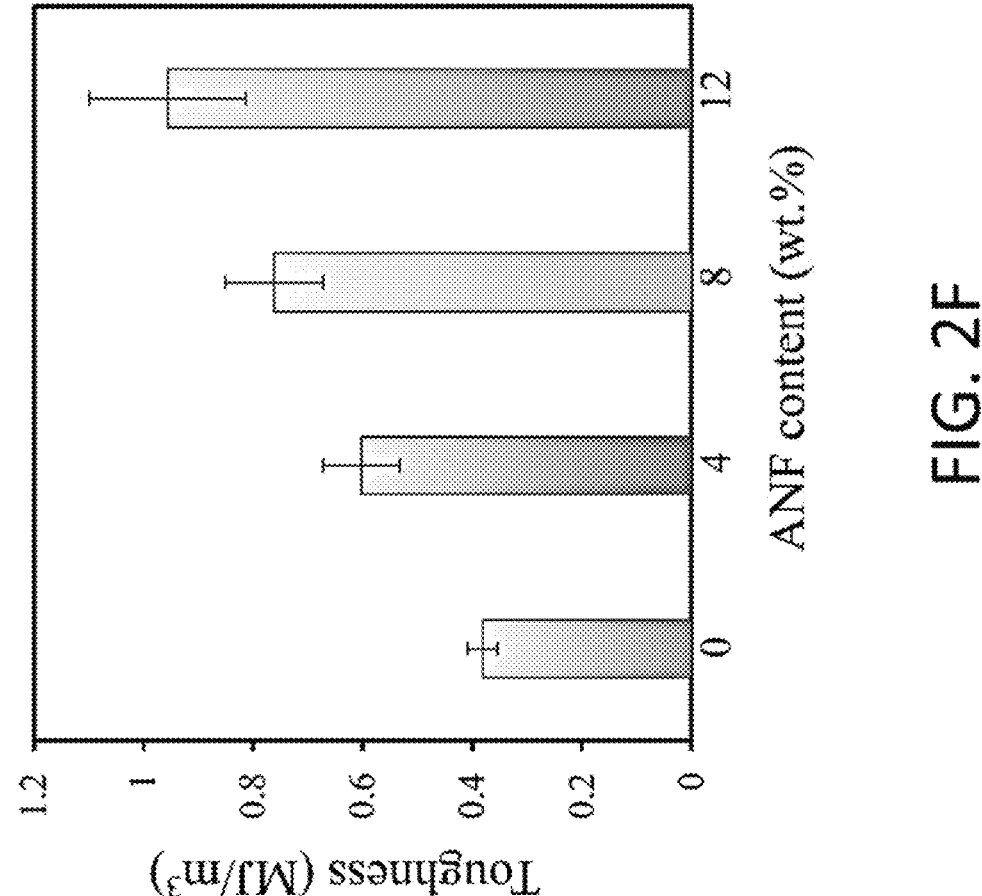

The quasistatic (strain rate: $10^{-2}$ s$^{-1}$) tensile testing of CNT and ANF-CNT mats, performed on an Instron E3000 system show that the tensile strength as well as the toughness—two mutually exclusive properties of common materials—synergistically increased with increasing ANF content, FIGS. 2D-2F. At 12% ANF, the tensile strength and toughness of ANF-CNT mat reached 32.6 MPa and 0.96 MJ/m³—a 30% and a 151% improvement over pure CNT mats. The strain-to-failure also increased from 2.7% to 5.1%, which is an 88% improvement over pure CNT mats. Much larger specific surface area (SSA) of ANFs (~900 m²/g) stemming from their small diameter (~2.9±0.9 nm) compared to MWCNTs (SSA<50 m²/g; diameter ~49±19 nm) effectively improved the interfacial reinforcing efficiency between ANFs and MWCNTs even with very small amounts of ANFs. The strengthened interfaces between ANFs and CNTs originating from the stronger hydrogen bonding and π-π stacking enabled effective stress transfer between the soft ANFs and the stiff CNTs that led to delayed failure and significant performance enhancement in ANF-CNT mats.

Figure 1C:
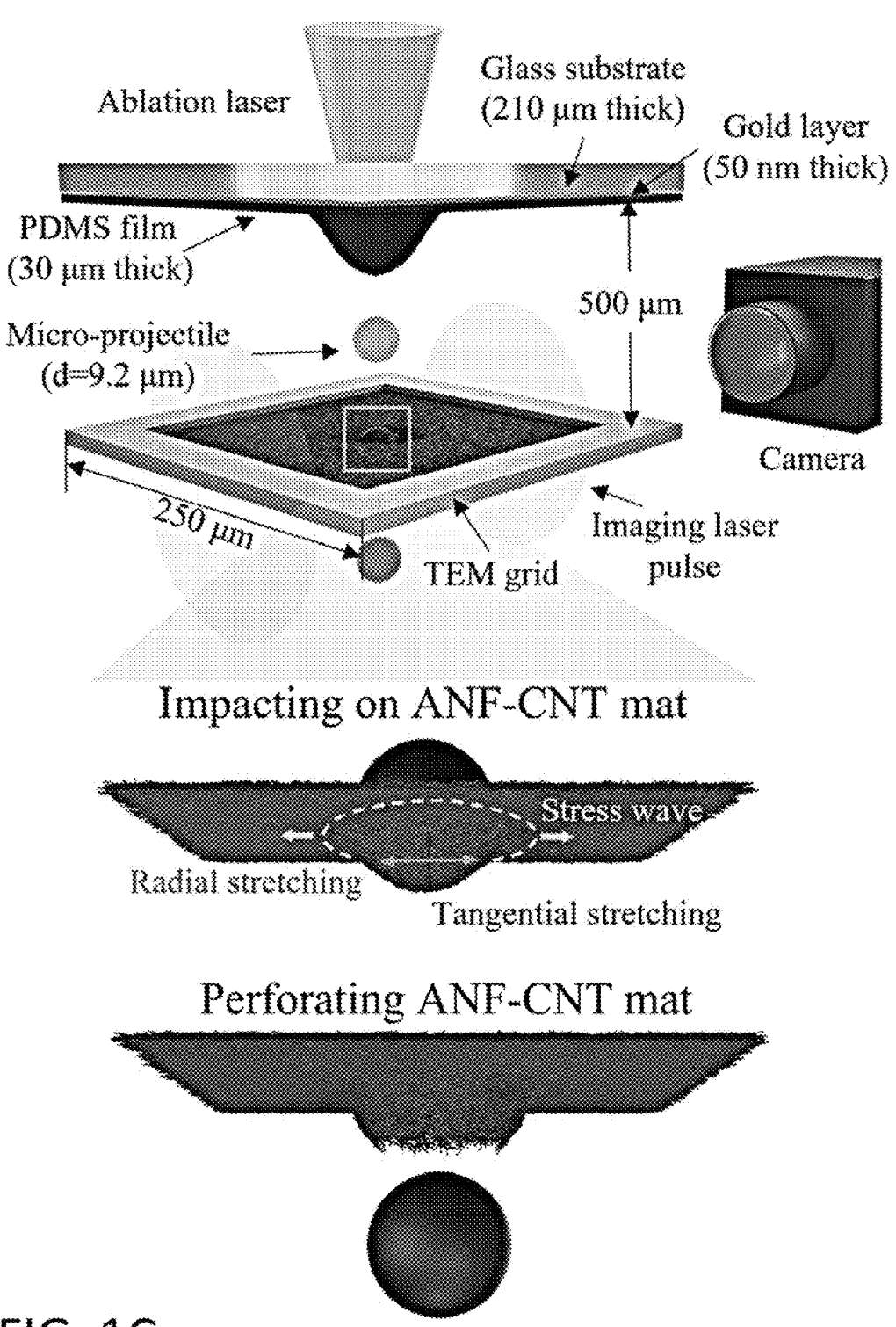
FIG. 1C shows an illustration of the laser-induced micro-projectile impact experiments showing the impact and perforation process of ANF-CNT mats.

To investigate the material behavior of the ANF-CNT mats under extreme loading conditions, high-velocity micro-projectile impact tests were performed in an advanced micro-ballistic testing apparatus with in-situ ultrafast multi-exposure imaging, FIG. 1C. In the micro-ballistic apparatus, the target material—a nanofiber mat—deposited on a TEM square grid, was placed ~500 μm away from the projectile launch pad, which was made of a 210 μm thick glass substrate coated with a 50 nm thick gold layer followed by a 30 μm thick cross-linked polydimethylsiloxane (PDMS) layer. Individual 9.2 μm diameter spherical silica projectiles, deposited and air dried on the launch pad, were selectively launched by the rapid expansion of PDMS film via laser-ablation of gold. A broad range of projectile impact velocities from 100 m/s to over 1 km/s was achieved by varying the laser pulse energy. The impact of supersonic (up to Mach 3) micro-projectiles on the target mats resulted in high-strain-rate (~$10^7$ l/s) deformation of the mats with a dynamic morphology evolution. Upon impact, the high-velocity spherical projectile equiaxially stretched the mat as the impact stress was rapidly delocalized because of the high effective wave speed in the material, FIG. 1C. The impact and perforation process of the mats was recorded in an ultra-fast multi-exposure image by a microscope camera illuminated by pico-second white-laser pulses at 90-154 ns intervals, gated by an acousto-optic modulator. The projectile velocity before and after perforation of the target was calculated from the measured distance between adjacent snapshots of the projectile divided by the time interval between consecutive imaging laser pulses and corrected for the air drag.

Figure 3:
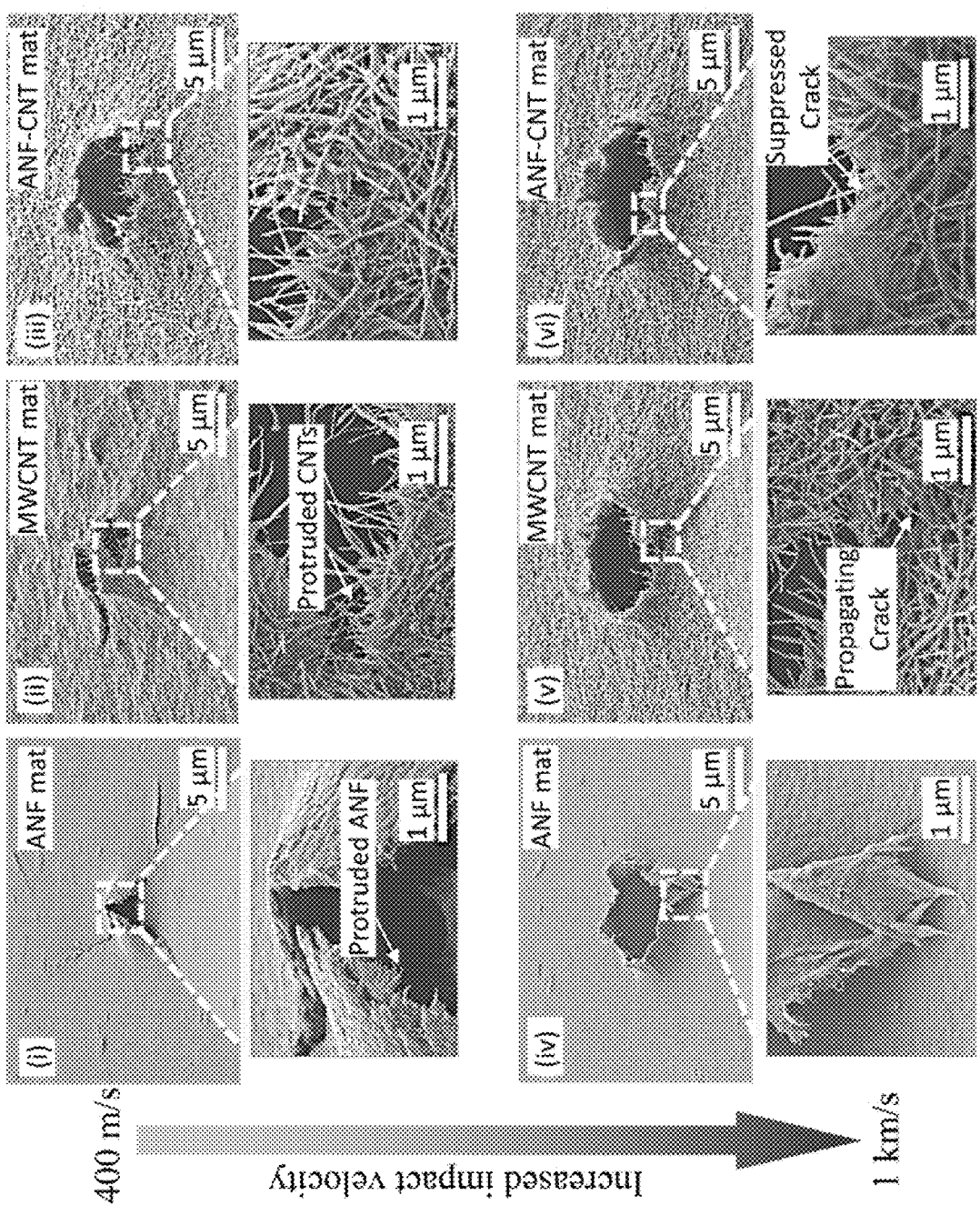
FIG. 3, panels (i-vi), shows the post-impact SEM images of nanofiber mats: panels (i, iv) show ANF mats, panels (ii, v) show MWCNT mats, and panels (iii, vi) show ANF-CNT mats with 8 wt. % ANF, impacted at 400 m/s and 1 km/s.

The post-impact SEM images of ANF, CNT, and ANF-CNT mats showed distinct deformation features with varying degrees of deformation depending on the material and impact velocity, FIG. 3, panels (i-vi). At low impact velocity (400 m/s), both the pure ANF and CNT mats showed radial crack formation around the perforation with broken individual nanofibers at the periphery, FIG. 3, panels (i, ii). The average length of protruded ANF was about 86±22 nm while the CNTs had a protruded length of 970±260 nm. The CNT mats showed a near circular piece of mat that was broken by the projectile while the ANF mats showed only large tears, FIG. 3, panels (i, ii). The difference in failure zone morphology originated from the interplay between the intrinsic properties (e.g., stiffness and tensile strength) and distinct inter-fiber interactions in ANF and CNT mats. The strong inter-fiber hydrogen bonds in ANF mats limited the mutual sliding between adjacent nanofibers and prevented the ultimate rupture of a large piece of mat under projectile impact. In contrast, the weak vdW force-dominated response of CNTs with larger extent of inter-fiber sliding resulted in rupture of the mat in projectile strike area. Therefore, under high-velocity projectile impacts, the strong inter-fiber interactions relative to low tensile strength of individual nanofibers led to nanofiber breaking as the dominant energy dissipation mechanism in ANF mats. On the contrary, long-range inter-fiber sliding with weak vdW interactions in the strong, stiff, and longer MWCNT network dissipated a large amount of energy before eventual fiber pull-out and failure. Surprisingly, the ANF reinforcement into the CNT mats—even in small quantities—substantially improved the interfacial interactions between fibers, hence the energy dissipation by the mat and retarded failure via suppressed radial crack formation (FIG. 3, panel (iii)). The extensive network of strong hydrogen bonds (bond energy ~2-30 kcal/mol) and π-π stacking (bond energy ~10 kcal/mol) interactions between ANFs and CNTs—in addition to the weak vdW interactions (bond energy ~0.1-1 kcal/mol) among CNTs—enabled seamless dynamic stress transfer in the mat leading to such failure retardation and ultimate performance enhancement observed in ANF-CNT mats.

As the impact velocity was increased to an extreme 1 km/s, the perforation changed to a near-circular shape for all types of mats. In ANF mats, the impact-induced adiabatic heating during the ~1 ns timescale dynamic deformation can increase the local temperature to as high as 600° C. (assuming ~50% of the absorbed energy is transferred to heat), which exceeds the glass transition temperature of PPTA fiber (~300° C.) and potentially nears the decomposition temperature of ANFs (~520° C.). In contrast to the brittle failure at 400 m/s velocity impacts, this local heating at high-velocity impacts resulted in softening of the ANF mats within the strike area, which was evident from the stretched film flaps observed surrounding the perforation (FIG. 3, panel (iv)). The adiabatic heating and the resultant material viscoelastic melt flow at these higher impact velocities led to higher energy dissipation by the ANF mats compared to lower velocity impacts. Similar to the low velocity impacts (400 m/s), the ANF reinforcements in ANF-CNT mats substantially suppressed the crack formation that was seen in pure CNT mats at 1 km/s impacts, FIG. 3, panels (v, vi).

The specific energy absorption ($E_a*$) of nanofibrous mats was calculated from the kinetic energy loss of the projectile—

$$\Delta KE = \frac{1}{2} m_p (v_i^2 - v_r^2),$$

where $m_p$ is the mass of the microprojectile, $v_i$ and $v_r$ are incident and residual velocities of microprojectiles—normalized by the mass of the nanofiber mat in the projectile strike area. The projectile velocities before and after perforation were corrected for the air-drag-induced deceleration. Considering the dense packing of individual ANFs in the pure ANF nanofiber mats seen in SEM images, the density of the ANF mats was assumed to be the same as that of the PPTA fibers (1440 kg/m³). The densities of ANF-CNT mats with different concentrations of ANFs as well as the pure CNT mats were measured from the weights of thicker (~25 μm) mats fabricated by the same vacuum-assisted filtration process as the thin mats. The 420±16 kg/cm³ density of pure CNT mats increased to 481±16 kg/cm³ with the addition of 12 wt. % ANFs (see Table 1).

Figure 4A:
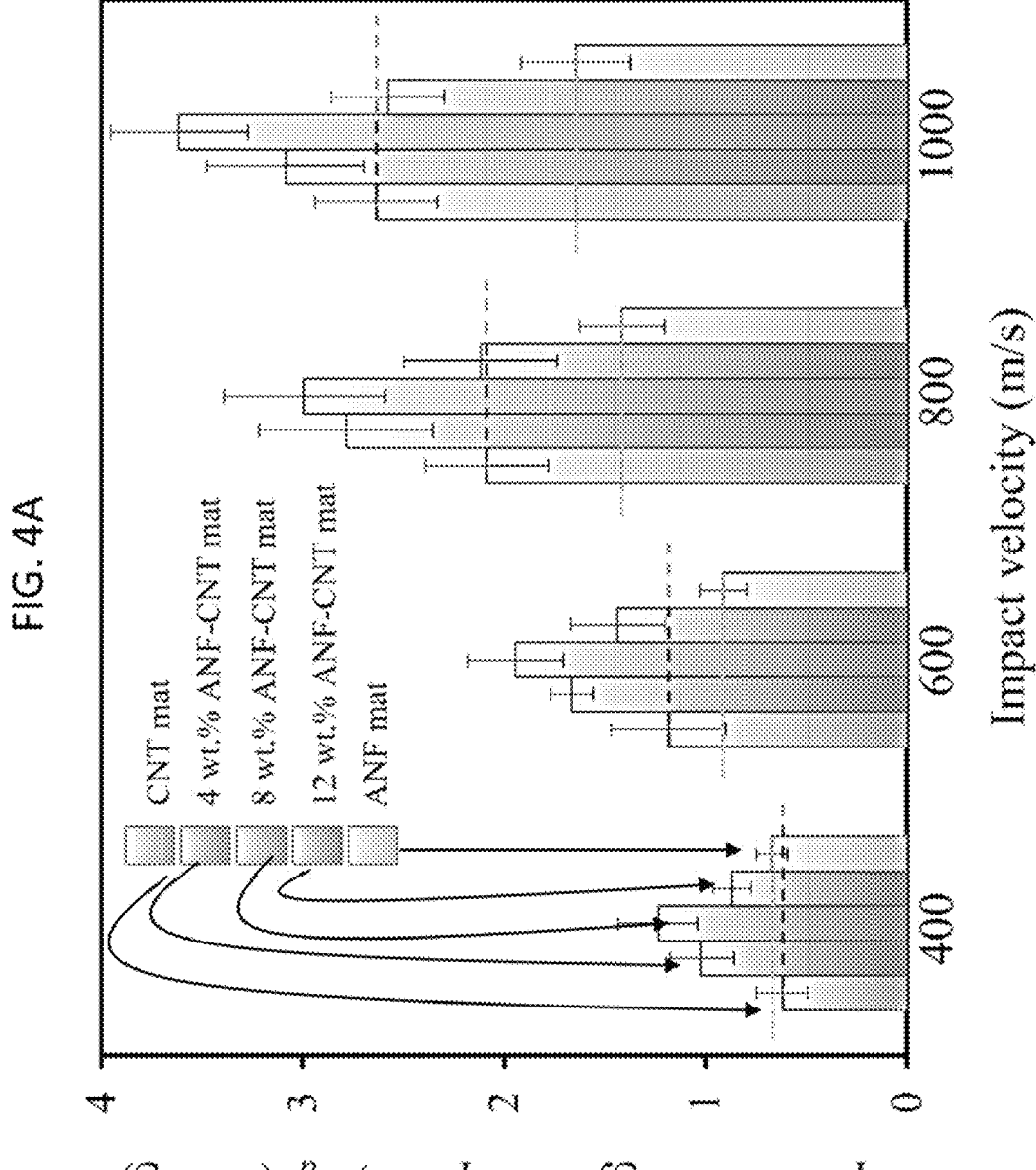
FIG. 4A shows specific energy absorption ($E_a$*) of ANF, CNT and ANF-CNT mats with different contents of ANF (4, 8 and 12 wt. %). The dashed lines label the performance of pure CNT and ANF mats.

The pure CNT mats showed comparable $E_a*$ to that of the pure ANF mats at 400 m/s impacts, FIG. 4A, and increased to 2.6 MJ/kg at 1 km/s impacts, which is 63% higher dissipation than in ANF mats. The significantly higher Young's modulus of individual MWCNTs (590-1105 GPa) compared to Kevlar fibers (~100 GPa) and the long-range interactions led to higher effective wave speed in the CNT mats for rapid stress delocalization—a larger area was deformed in CNT mats (36% larger than ANF mats) upon projectile impact (FIG. 3, panels (iv, v)), engaging more material participation in the energy dissipation process. Reinforcing the CNT mats with small amounts of ANFs as an interfacial strengthening phase effectively suppressed the local crack formation and significantly improved the mat's ability to dissipate energy under high-velocity projectile impacts, hence enhancing the intrinsic toughness of nano-fiber mats. This strengthened inter-tube sliding with recon-figurable hydrogen bond interactions—i.e., the repetitive bond formation, breaking, and re-formation during dynamic evolution of the fiber morphology of the mats during pro-jectile-induced stretching—improved $E_a^*$ by a surprising 100% in ANF-CNT mats with just 8 wt. % ANF, at 400 m/s impacts.

However, contrary to quasistatic mechanical perfor-mance, a much higher concentration (12 wt. %) of ANFs did not further improve the $E_a^*$ in dynamics. The stronger interfacial interactions within ANF-rich domains between CNTs potentially limited the long-range mutual sliding of CNTs—the dominant energy dissipating mechanism—which resulted in a lower $E_a^*$ in 12 wt. % ANF-CNT mats. In the dynamic regime, this study shows that there was an optimal concentration of ANFs (8 wt. %) in ANF-CNT mats that favorably exploited the hydrogen bond and $\pi$-$\pi$ stacking interactions to offer a maximal specific energy absorption to outperform both the pure ANF and CNT mats by 84% and 100% (400 m/s impact), respectively.

The dynamic stretching of the mat by projectile effec-tively engaged long-range inter-fiber sliding dissipation mechanisms as the morphology of the mat evolved with nanofibers reorienting, bending, and stretching much before the eventual nanofiber fracture that resulted in the ultimate failure of mats. The stretched and broken ANFs that con-nected ANFs and MWCNTs and the broken individual MWCNTs at the periphery of the perforation were evident in post-impact SEM, FIG. 5A. Compared to the weak vdW-interaction-dominated energy dissipation in pure CNT mats, the progressive cycles of hydrogen bonds breaking, re-forming, and breaking mechanisms and $\pi$-$\pi$ stacking inter-actions in ANF-CNT mats contributed to substantial energy dissipation. Moreover, the strengthened interfacial interac-tions between ANFs and CNTs effectively enhanced the stress transfer within the ANF-CNT nanofiber network, thereby retarding the failure and eventually dissipating energy via breaking of some individual CNTs at the strike area, FIG. 5B.

Figure 4B:
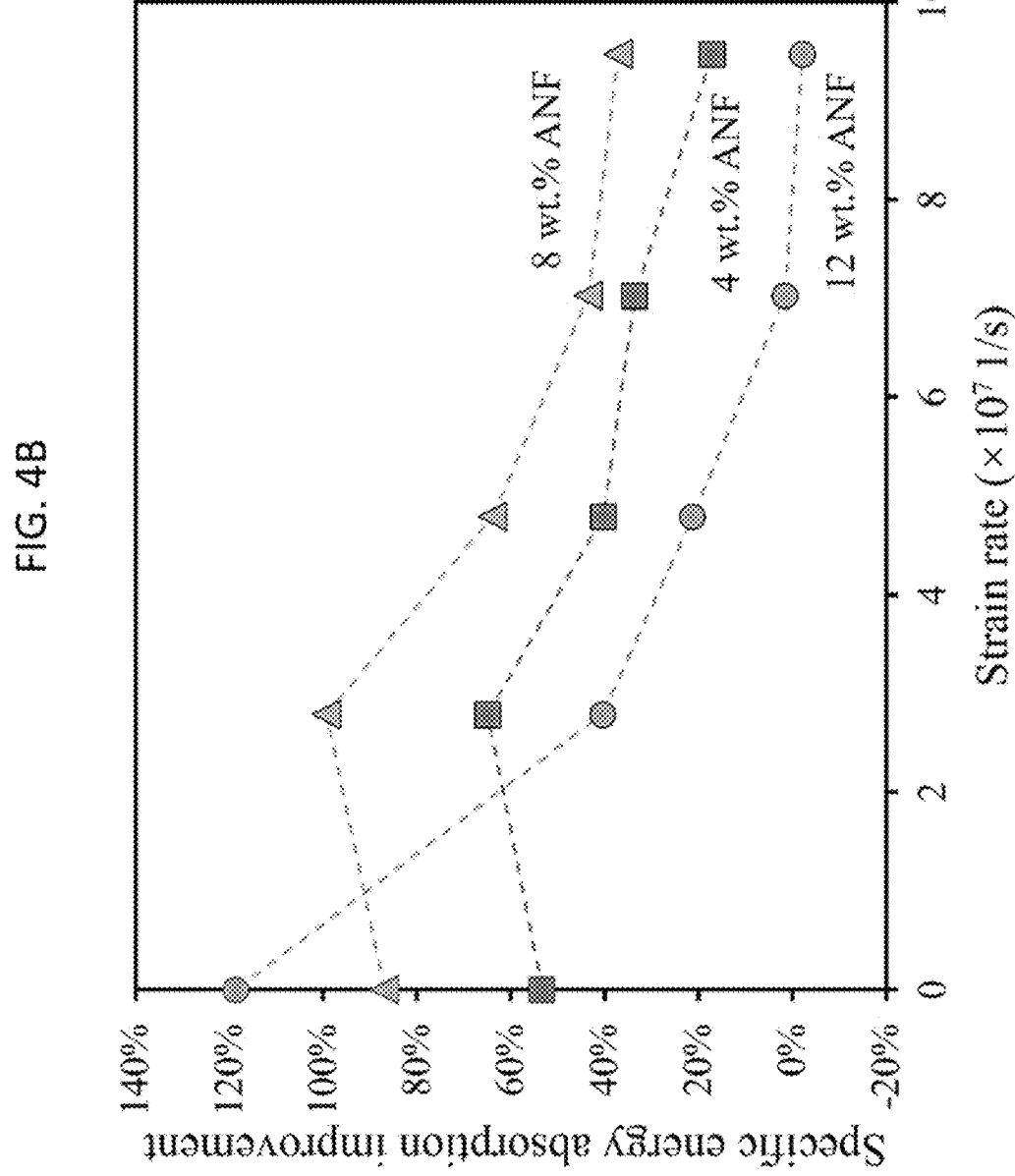
FIG. 4B shows improvement in specific energy absorption of ANF-CNT mats with different ANF content compared to pure CNT mats with increasing deformation strain rate under quasistatic tensile testing and supersonic microprojectile impacts.

Intriguingly, a strong strain rate dependency was also observed in the response of ANF-CNT mats that originated from the response timescales of the hydrogen bond interac-tions. The observed enhancement in $E_a^*$ due to ANF rein-forcement increased from quasistatics to dynamics and then decreased with further increase in high strain rates. For example, the $E_a^*$ enhancement in 8 wt. % ANF-CNT mats compared to pure CNT mats increased from 87% to 98% when strain rate increased from quasistatic ($1\times10^{-2}$ s$^{-1}$) to dynamic ($2.8\times10^7$ s$^{-1}$; corresponded to 400 m/s impact), followed by a decrease within high-strain-rate regime to 36% as the strain rate was increased to $9.5\times10^7$ s$^{-1}$ (corre-sponded to 1 km/s impact) (FIG. 4B). The 4 wt. % ANF-CNT mats also showed a similar trend. The hydrogen bond broke in 2-3 ps while its reformation took 20 ps to >10 ns. (Gaffney, K. J. et al., *J. Phys. Chem. A* 2002, 106 (41), 9428-9435.) Although these timescales were highly depen-dent on the material and environment, they still gave an estimate of the response timescales of interactions relative to the experimental timescales of the quasistatic tensile and microprojectile impact experiments. Unlike in quasistatic experiments (duration ~tens of seconds), the projectile-impact-induced dynamic tensile deformation occurred at the ~ns timescale—the projectile penetration time decreased from 1.25 ns to 0.5 ns as the impact velocity was increased from 400 m/s to 1 km/s, FIG. 5C. The increase in specific energy absorption enhancement by ANF reinforcement from quasistatic to dynamics potentially arose from the strain-rate dependent intrinsic polymer properties as well as the inter-fiber interactions. With further increase of impact velocity, the decreasing time available for a continuous breaking and reformation of hydrogen bonds at the ultra-high strain rates (up to $9.5\times10^7$ s$^{-1}$) limited the ANF-CNT mat's ability to dissipate projectile kinetic energy. This limitation decreased the ANF-CNT mat's $E_a^*$ enhancement over CNT mats with increasing strain rate. Regardless, the 4 and 8 wt. % ANF-reinforced CNT mats still outperformed the pure CNT mats even at 1 km/s impacts. Though the impact-induced adia-batic heating could potentially deteriorate the performance of the ANFs—as suggested by the TGA, FIG. 2C—the effects were likely minimal because of the small ANF content and superior thermal conductivity of the dominant constituent, CNTs. The rate of the deterioration in perfor-mance enhancement with increasing strain rate increased with increasing ANF reinforcement, underscoring the effects of the response-timescale of interfacial hydrogen bonds in ANF-CNT mats. The ultra-high-strain-rate (up to 108 s$^{-1}$) experiments with deformations that occurred at a compa-rable timescale to that of the hydrogen bond breaking and reformation also showed the critical roles and limitations of these interactive mechanisms at high strain rates that will enable the design of high-performance composites for vari-ous engineering applications in extreme environments, FIG. 5B.

Figure 6:
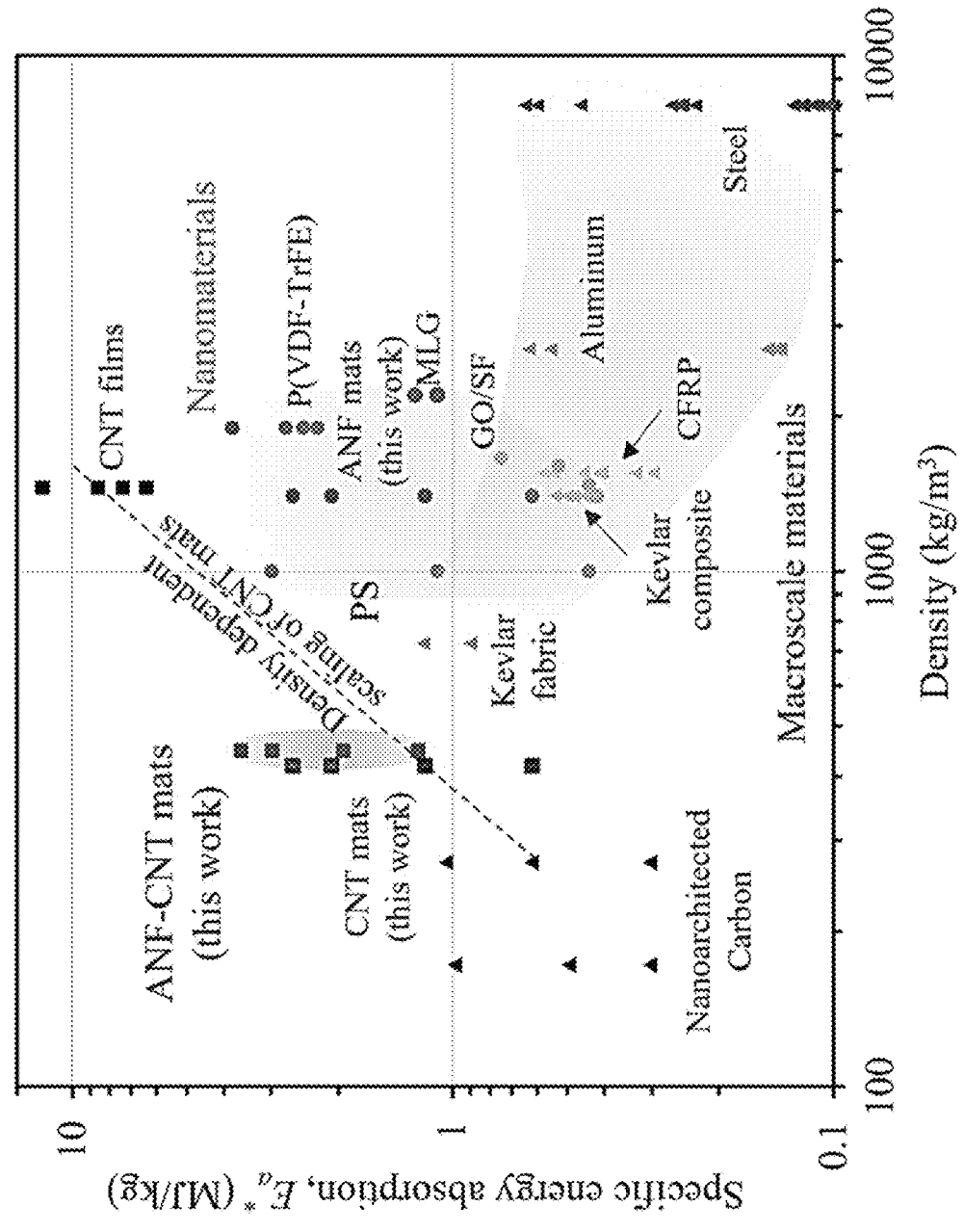
FIG. 6 shows a comparison of specific energy absorption, $E_a^*$, of ANF-CNT mats to other nano and macroscale protective materials.

The specific energy absorption of the ANF-CNT mats is superior to other bulk materials such as steel, aluminum, carbon fiber reinforced plastic (CFRP), Kevlar fabric, and Kevlar/polyvinyl butyral composite and some of the novel nanomaterials studied recently, such as graphene, CNT fibers, and carbon nanolattices, because of their engineered nanostructure and interactive morphology with much lower density, FIG. 6. (Goldsmith, W. et al., *Int. J. Mech. Sci.* 1971, 13 (10), 843-866; Dean, J. et al., *Int. J. Impact Eng.* 2009, 36 (10), 1250-1258; Gupta, N. K. et al. *Int. J. Impact Eng.* 2006, 32 (12), 1921-1944; Fujii, K. et al., *Int. J. Impact Eng.* 2002, 27 (5), 497-508; Park, Y. et al., *Int. J. Impact Eng.* 2014, 72, 67-74. Lee, B. L. et al., *J. Compos. Mater.* 2001, 35 (18), 1605-1633; Liu, Z. et al., *Carbon* 2019, 153, 320-329; Lee, J. -H. et al., *Science* 2014, 346 (6213), 1092; Xie, W. et al., *Nano Lett.* 2019, 19 (6), 3519-3526; Portela, C. M. et al., *Carbon. Nat. Mater.* 2021.) Compared to ultra-thin polymeric films with significant specific energy absorption, the low density and high thermal stability make the ANF-CNT mats a promising candidate for developing structural materials at extreme service conditions. Although the obtained specific energy absorption of the ANF-CNT mats was lower than the direct-spun CNT mats—which stems from the parent MWCNT mats with much lower density and functionalization induced defects—the introduc-tion of ANF reinforcements effectively increased the energy dissipation from strengthened and reconfigurable interfacial sliding mechanisms. (Hyon, J. et al., *Adv. Sci.* 2021, 8 (6), 2003142.) The fabrication process also offers an efficient approach to further improve the dynamic performance of different forms of CNT-based materials—such as yarns, mats, foams, and fabric—as well as other material systems where the hydrogen bond interactions can be engineered, e.g., cellulose fibers. These nanofibrous materials made of stiff CNTs linked by hydrogen bonds to soft ANFs exhibited simultaneously high strength and toughness—which are often mutually exclusive properties in common materials—that led to exceptional ballistic performance under high-velocity microprojectile impacts. Moreover, the outstanding thermal-stability of ANFs compared to other polymers (up to 520° C.) complements and further enhances the capability of thermally-stable CNT-based nanofibrous materials for developing multifunctional structural shields that provide robust functionality in extreme environments.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A composite material comprising
at least 80 weight % of graphitic carbon comprising functional groups capable of forming hydrogen bonds, the graphitic carbon in the form of a mat of randomly entangled elongated structures;
not more than 20 weight % of nanofibers of a polymer dispersed within the graphitic carbon, the nanofibers comprising corresponding functional groups capable of forming hydrogen bonds with the functional groups of the graphitic carbon, each nanofiber in the form of a plurality of individual polymer chains of the polymer bundled together; and
a plurality of hydrogen bonds at an interface formed between the graphitic carbon and the nanofibers, the plurality of hydrogen bonds formed between the functional groups of the graphitic carbon and the corresponding functional groups of the nanofibers, wherein the polymer is selected from the group consisting of poly(vinyl alcohol), poly(paraphenylene terephthalamide), poly(etherimide), poly(amide-imide), and combinations thereof, and the composite material does not comprise cellulose.

2. The composite material of claim 1, wherein the nanofibers are randomly entangled with the elongated structures.

3. The composite material of claim 1, wherein the composite material is porous and surfaces of the elongated structures and surfaces of the nanofibers define pores distributed throughout the composite material.

4. The composite material of claim 1, wherein the elongated structures have an aspect ratio of at least 100 and a diameter of not more than 1 μm.

5. The composite material of claim 1, wherein the elongated structures comprise carbon nanotubes.

6. The composite material of claim 1, wherein the functional groups of the graphitic carbon are directly covalently bound to a carbon of the graphitic carbon.

7. The composite material of claim 1, wherein the functional groups of the graphitic carbon comprise hydrogen bond acceptor groups and the corresponding functional groups of the polymer or the nanofiber thereof comprise hydrogen bond donor groups.

8. The composite material of claim 7, wherein the functional groups of the graphitic carbon comprise carboxyl groups.

9. The composite material of claim 1, wherein the polymer of the nanofibers is poly(paraphenylene terephthalamide).

10. The composite material of claim 1, wherein the graphitic carbon is present at an amount of at least 90 weight %.

11. The composite material of claim 10, wherein the nanofibers are present at an amount in a range of from 3 weight % to 10 weight %.

12. The composite material of claim 11, wherein the functional groups of the graphitic carbon are present at an amount of no more than 13 weight %.

13. The composite material of claim 1, characterized by an $E_a^*$ enhancement of at least 95% as measured using a projectile impact velocity of 400 m/s as compared to a comparative material composed of only the graphitic carbon of the composite material.

14. The composite material of claim 1, wherein the nanofibers are randomly entangled with the elongated structures and wherein the composite material is porous and surfaces of the elongated structures and surfaces of the nanofibers define pores distributed throughout the composite material.

15. The composite material of claim 14, wherein the graphitic carbon is present at an amount of at least 90 weight %.

16. The composite material of claim 15, wherein the elongated structures comprise carbon nanotubes and the polymer of the nanofibers is poly(paraphenylene terephthalamide).

17. A method of using the composite material, the method comprising exposing the composite material of claim 1 to a source of projectiles and intercepting a projectile from the source.

18. A composite material comprising
at least 80 weight % of graphitic carbon comprising functional groups capable of forming hydrogen bonds, the graphitic carbon in the form of a mat of randomly entangled elongated structures;
not more than 20 weight % of a polymer or a nanofiber thereof, dispersed within the graphitic carbon, the polymer or the nanofiber thereof comprising corresponding functional groups capable of forming hydrogen bonds with the functional groups of the graphitic carbon; and a plurality of hydrogen bonds at an interface formed between the graphitic carbon and the polymer or the nanofiber thereof, the plurality of hydrogen bonds formed between the functional groups of the graphitic carbon and the corresponding functional groups of the polymer or the nanofiber thereof, wherein the polymer or the nanofiber thereof is selected from the group consisting of poly(vinyl alcohol), poly(paraphenylene terephthalamide), poly(etherimide), poly(amide-imide), and combinations thereof, and the composite material does not comprise cellulose, wherein the composite material is porous and surfaces of the elongated structures and surfaces of the polymer or the nanofiber thereof define pores distributed throughout the composite material.

19. The composite material of claim 18, wherein the graphitic carbon is present at an amount of at least 90 weight %.

20. The composite material of claim 19, wherein the elongated structures comprise carbon nanotubes and the polymer or the nanofiber thereof is poly(paraphenylene terephthalamide.

* * * * *